US009550556B2

(12) United States Patent
Kennedy

(10) Patent No.: US 9,550,556 B2
(45) Date of Patent: Jan. 24, 2017

(54) POWER SYSTEM FOR VESSELS

(71) Applicant: ABB AS, Billingstad (NO)

(72) Inventor: Louis Kennedy, Singapore (SG)

(73) Assignee: ABB AS, Billingstad (NO)

( * ) Notice: Subject to any disclaimer, the term of this patent is extended or adjusted under 35 U.S.C. 154(b) by 458 days.

(21) Appl. No.: 14/156,226

(22) Filed: Jan. 15, 2014

(65) Prior Publication Data
US 2014/0132064 A1 May 15, 2014

Related U.S. Application Data

(63) Continuation of application No. PCT/EP2011/062236, filed on Jul. 18, 2011.

(51) Int. Cl.
B60L 1/00 (2006.01)
B63H 23/24 (2006.01)
H02J 3/00 (2006.01)
B64D 41/00 (2006.01)
B60L 3/00 (2006.01)
B63H 23/00 (2006.01)
B63H 25/42 (2006.01)

(52) U.S. Cl.
CPC ............... *B63H 23/24* (2013.01); *B60L 3/00* (2013.01); *B60L 3/0023* (2013.01); *B60L 3/0092* (2013.01); *B63H 23/00* (2013.01); *B63H 25/42* (2013.01); *B64D 41/00* (2013.01); *H02J 3/005* (2013.01)

(58) Field of Classification Search
CPC .......... H02J 3/005; B64D 41/00; B63H 23/00; B63H 23/24; B63H 25/42; B60L 3/0092; B60L 3/0023; B60L 3/00

USPC ... 440/3, 1, 6; 307/9.1, 67; 701/21; 323/348
See application file for complete search history.

(56) References Cited

U.S. PATENT DOCUMENTS 4,517,471 A 5/1985 Sachs
2004/0070370 A1 4/2004 Emura
(Continued)

FOREIGN PATENT DOCUMENTS

DE 3628137 A1 2/1988
EP 2243700 A2 10/2010
JP 2010070185 A 4/2010

OTHER PUBLICATIONS

Notice of Reasons for Rejection from the Japanese Patent Office Application No. 2014-520539 Issued: May 19, 2015 3 pages.
(Continued)

*Primary Examiner* — Arnold Kinkead
(74) *Attorney, Agent, or Firm* — Whitmyer IP Group LLC

(57) ABSTRACT

A power system for dynamic positioning of a vessel. The power system reduces fuel consumption, carbon buildup deposits and the risk of cylinder bore glazing while in combustion engine driven generators and provides an adequate protection against blackouts. The power system includes first and second combustion engine driven generators, a battery unit, and a converter unit arranged to provide power to the vessel from the battery unit. A first operational state of the power system in which the first combustion engine driven generator is arranged to deliver power to the vessel, and a second operational state, in which the first generator is subject to a fault, the second combustion engine driven generator arranged to deliver power to the vessel, and the converter unit is arranged to deliver power to the vessel during transition between the states.

19 Claims, 2 Drawing Sheets

(56) References Cited

U.S. PATENT DOCUMENTS

| | | |
|---|---|---|
| 2005/0200205 A1 | 9/2005 | Winn et al. |
| 2007/0085421 A1 | 4/2007 | Drubel |
| 2009/0156068 A1* | 6/2009 | Barrett .................. B63H 21/20 440/3 |
| 2010/0060076 A1 | 3/2010 | Gemin et al. |

OTHER PUBLICATIONS

International Search Report & Written Opinion of the International Searching Authority Application No. PT/EP2011/062236 Completed: May 4, 2012; Mailing Date: May 15, 2012 7 pages.

* cited by examiner

POWER SYSTEM FOR VESSELS

FIELD OF THE INVENTION

The present disclosure relates to a power system for vessels, and in particular to a power system which provides power backup for dynamic positioning of vessels. The present disclosure furthermore relates to a sectionalised power system, which comprises at least two such power systems.

BACKGROUND OF THE INVENTION

Dynamic positioning (DP) is a method of maintaining the position and heading of a vessel generally by means of the propulsion means of the vessel. Vessels which utilize dynamic positioning include semi-submersible rigs and drillships.

Safety related rules have been set for dynamic positioning ships. These rules define classes DP1, DP2 and DP3. Class rules for DP2 and DP3 vessels demand that position must be maintained following a single fault. In practice this means that blackouts must never be allowed to occur. To achieve this, DP vessels are normally run in a split bus configuration with open busties. For semi-submersible rigs this generally means a two-split configuration, while for drillships a three-split configuration is typical. These configurations are sufficient to prevent blackout and meet the class requirements for DP2 and DP3 operation under most environmental conditions.

Rigs are often operated with extra redundancy in addition to that provided by the split bus configuration. Some rig operators provide rigs with at least two running generators in each split during DP operations, to minimize the risk of partial blackout within each split. However, configurations with several running generators have several drawbacks.

SUMMARY OF THE INVENTION

The present inventor has become aware of that in normal operation the load on the generators in configurations having several running generators in each split can typically be as low as 15-20%.

Operations with low loads have several disadvantages. For instance, such operation has poor efficiency resulting in high specific fuel consumption by the diesel engines of the diesel generators. Furthermore, $CO_2$, $NO_x$, $SO_x$ and particulate emission is increased, and there is increased carbon buildup and risk of cylinder bore glazing in the diesel engines.

In view of the above, an object of the present disclosure is to provide a power system for a DP vessel which has a sufficient level of robustness against partial and full blackouts while reducing buildup of carbon deposits and the risk of cylinder bore glazing.

Another object of the present disclosure is to reduce the specific fuel consumption and emissions of pollutants to the environment.

Thus, the present disclosure provides a power system for dynamic positioning of a vessel, which power system comprises: a first combustion engine driven generator, a second combustion engine driven generator, a battery unit, and a converter unit arranged to provide power to the vessel from the battery unit, wherein in a first operational state of the power system only the first combustion engine driven generator is arranged to deliver power to the vessel, and wherein in a second operational state in which the first combustion engine driven generator is subject to a failure, the second combustion engine driven generator is arranged to deliver power to the vessel, and wherein the converter unit is arranged to deliver power to the vessel during the transition from the first operational state to the second operational state.

By providing a power system where at least one combustion engine driven generator, e.g. the second combustion engine driven generator, is not running and thus not providing power to the vessel in normal operation, the load on the running combustion engine driven generator, i.e. the first combustion engine driven generator is increased. For instance, in case of a two generator configuration per bus split, the load is doubled on the running generator, i.e. the generator which delivers the power to the vessel for dynamic positioning thereof. By increasing the load on a generator, the specific fuel consumption is reduced. Furthermore, the increased load reduces the buildup of carbon deposits and the risk of cylinder bore glazing.

By providing a power system where at least one combustion engine driven generator is not running in normal operation, the total engine running hours for the power system are accumulated more slowly.

Advantageously, lower fuel consumption reduces the fuel costs and the emission of hazardous substances. Moreover, slower accumulation of running hours and reduced buildup of carbon deposits and reduced risk of cylinder bore glazing could significantly lengthen the maintenance intervals of the combustion engine driven generators.

The first operational state may be a state in which the first combustion engine driven generator is in a normal operational mode. Hence, the second combustion engine driven generator commences operation and thus delivers power to the vessel when the first combustion engine driven generator fails. The battery unit and converter unit allows for essentially continuous power delivery in a bus split in the time between the occurrence of the failure of the first combustion engine driven generator and the commissioning of the second combustion engine driven generator in the second operational state. Thus, the battery unit and the converter unit is arranged to deliver power in the transition between the first operational state and the second operational state.

A bus split is herein to be construed as a bus or busbar which is separated, i.e. a bus that is disconnected from other buses or busbars by means of one or more busties or disconnectors.

One embodiment comprises a bus, wherein the first combustion engine driven generator and the second combustion engine driven generator are connectable to the bus, and wherein the converter unit is connectable to the bus and to the battery unit.

One embodiment comprises a rotary converter, wherein the converter unit is connectable to the bus via the rotary converter. By means of the rotary converter bumpless maintenance of the power system frequency and voltage can be provided until the converter unit begins delivering power in the event that the running generator i.e. the first combustion engine driven generator trips. Especially, the bumpless maintenance can be achieved by the inertia provided by the rotatable shaft or rotor of the rotary converter.

In one embodiment the rotary converter comprises a generator and an induction machine electrically coupled via a rotatable shaft of the rotary converter. Beneficially, the converter unit, which may comprise a variable frequency drive, can thereby control the rotational speed of the induction motor, and hence control the power delivered to the vessel via the generator, and compensate for frequency changes in the power system in case of e.g. load variations. Thus, the converter unit is able to deliver power to the vessel before any inertial forces slows the rotation of the common rotatable shaft of the rotary converter whereby a continuous and bumpless power delivery can be provided to the vessel. The generator of the rotary converter can compensate for voltage changes in the power system. Thus, adequate robustness against partial or full blackout can be provided. Partial blackout is to be understood to mean a blackout or power provision failure in one bus or bus split, while full blackout means a blackout or power provision failure in all buses or bus splits.

In one embodiment the generator is an MV synchronous generator. An MV generator, i.e. a medium voltage generator can be connected to a bus split of the power system, which bus split is typically a medium voltage bus, for instance 11 kV.

In one embodiment the induction machine is an LV induction machine. An LV induction machine, i.e. a low voltage induction machine, provides an interface between the converter unit and the generator in the rotary converter, and drives the generator. An LV induction machine can hence be connected to an LV converter unit. As an example, an LV induction machine may be rated at 690 V, which can then be connected to a low voltage converter unit designed to operate at 690 V. Thereby existing standard components can be utilized for the converter unit and battery unit which together with the rotary converter in one embodiment form part of a power backup arrangement in the power system.

In one embodiment the induction machine is connectable to the converter unit, and wherein the generator is connectable to the bus. Hence, the generator i.e. the rotor of the generator is driven by the induction machine. In particular, the induction machine and the generator share the same rotary shaft for power transfer.

The converter unit preferably comprises a DC to AC converter, i.e. an inverter, for transforming the direct current provided by the battery unit to an alternating current which is utilized for controlling the induction motor.

In one embodiment the converter unit is adapted to deliver power to the vessel when a power system frequency is below a predetermined threshold. Thus, a control unit can provide appropriate switching of the switching elements e.g. semiconductor devices of the converter unit in order to maintain the voltage and frequency level in the power system even during transition between the first and the second operational state.

In one embodiment the converter unit comprises a variable-frequency drive for controlling the rotational speed of the induction motor.

Beneficially, at least two power systems as disclosed herein can be utilized in a sectionalised power system. To this end the sectionalised power system comprises at least two power systems and at least one bustie which can connect the at least two power systems. A sectionalised power system is hence a power system for dynamic positioning of a vessel comprising several sets of first and second combustion engine driven generators and corresponding sets of battery units and converter units. In DP operations the busties are typically open in an attempt to limit the propagation of a fault to one bus split. This configuration reduces the risk of full blackouts and is generally used for semi-submerged rigs and drillships.

Preferably, a marine vessel may comprise such a sectionalised power system.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise.

BRIEF DESCRIPTION OF THE DRAWINGS

The inventive concept will not be described, by way of example, with reference to the accompanying drawings, in which.

DETAILED DESCRIPTION OF THE INVENTION

The inventive concept will now be described more fully hereinafter with reference to the accompanying drawings, in which certain embodiments are shown. It is to be noted, however, that the vessel and power systems disclosed herein may be embodied in many different forms and should not be construed as limited to the embodiments set forth hereinafter; rather, these embodiments are provided by way of example so that this disclosure will be thorough and complete, and will fully convey the scope of the invention to those skilled in the art. Like numbers refer to like elements throughout the description.

Figure 1:
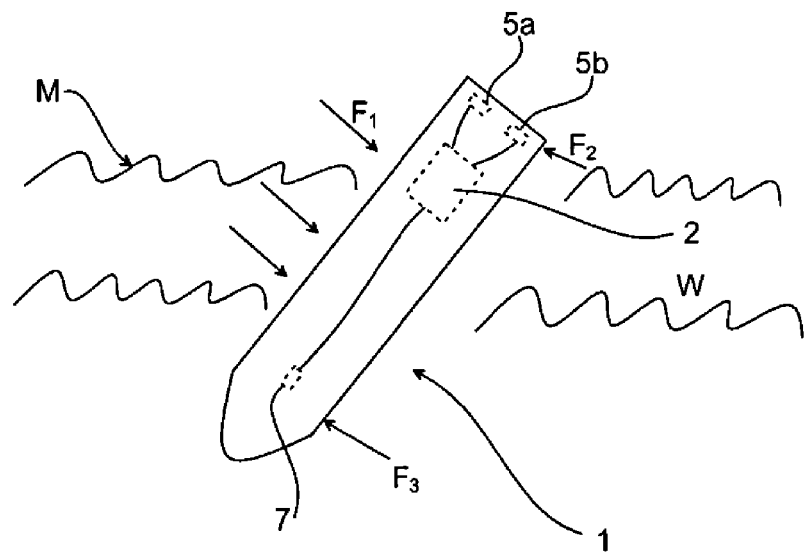
FIG. 1 is a top view of a vessel performing dynamic positioning in a body of water.

With reference to FIG. 1 a marine vessel 1, in the following referred to as a vessel, is shown. The vessel 1 is shown from above in a body of water W, where it is subject to forces F1 due to environmental effects which may include wave motion M, currents and wind.

The vessel 1 may for instance be a drillship or a semi-submersible rig or any other type of vessel utilizing dynamic positioning for controlling the position and heading thereof.

The exemplary vessel 1 comprises a sectionalised power system 2 and thrusters 5a, 5b and 7 in operative connection with the sectionalised power system 2. The vessel 1 further has a sensor system and control system for controlling the thrusters such that the vessel maintains its position and heading despite the forces F1 acting on the vessel 1. The sensor system and control system will not be described in more detail herein, as such systems are known for the purposes of dynamic positioning.

It is further to be noted that vessel 1 is merely an example of a vessel suitable for use with a sectionalised power system 2, which will be described in more detail herein. Thus, in general a vessel fitted with the sectionalised power system 2 may have a different configuration of thrusters or propulsive devices than in the illustration shown in the example of FIG. 1. Furthermore, it is to be noted that the placement of the sectionalised power system 1 is schematic. Hence, the sectionalised power system 1 could be situated at another location or locations in case of a distributed sectionalised power system.

Returning to FIG. 1 the vessel 1 has a bow thruster 7 arranged at the bow of the vessel 1 in a transverse direction with respect to the longitudinal extension of the vessel 1, and two azimuth thrusters 5a and 5b. The azimuth thrusters 5a and 5b are rotatable around respective essentially vertical axes for positioning control of the vessel 1. Thus, when the sensor system senses the forces F1 applied to the vessel 1, the control system provides control signals to the thrusters 5a, 5b and 7 for the generation of thrust providing counterforces F2 and F3 to the forces F1. To this end the sectionalised power system 2 is arranged to provide power to the thrusters 5a, 5b and 7. In particular, the sectionalised power system 2 is so arranged, as will be explained in the following, that even if there is a generator failure in the sectionalised power system 2 it provides power to some or all of the thrusters 5a, 5b and 7 of the vessel 1 in such a manner that the vessel can maintain position.

Advantageously, the sectionalised power system 2 presented herein provides a safe means for power provision to the vessel 1 while reducing the specific fuel consumption and carbon buildup deposits compared to existing backup power solutions.

Examples of a power system and a sectionalised power system will be described in more detail in the following.

Figure 2:
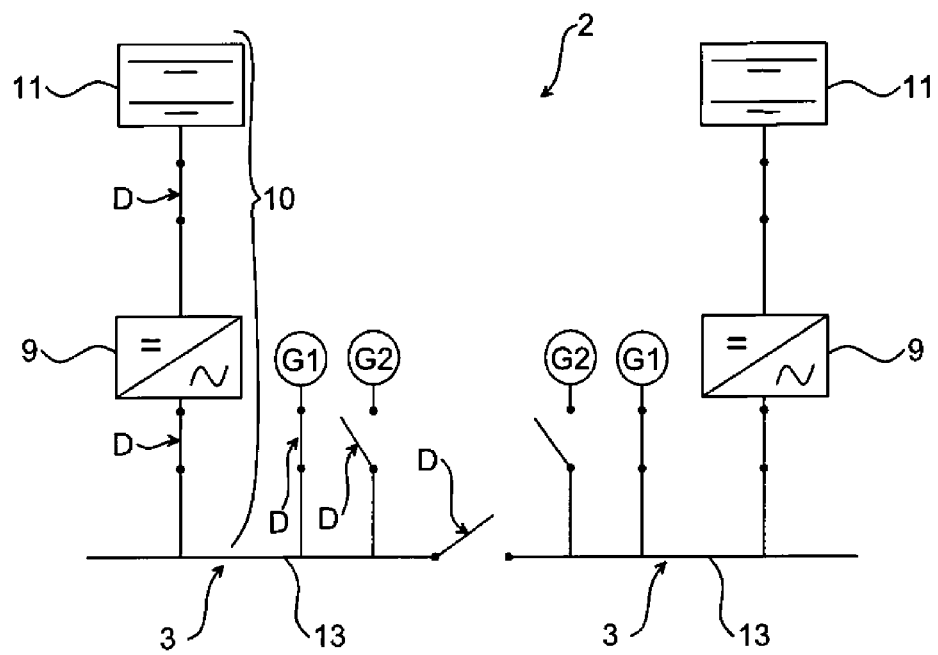
FIG. 2 is a schematic single line diagram of a sectionalized power system comprising two power systems.

FIG. 2 shows a single-line diagram of an example of sectionalised power system 2 comprising several power systems 3. Preferably, the sectionalised power system 2 is a three-phase power system, but it is to be understood that variations with fewer or more phases are also possible.

Each power system 3 comprises a first combustion engine driven generator G1 and a second combustion engine driven generator G2 such as diesel generators. In other examples the combustion engine driven generators G1 and G2 can be gas-turbines or other combustion engines.

Each of the first combustion engine driven generator G1 and the second combustion engine driven generator G2 comprises a combustion engine driven engine and a generator having a rotor which is driven by means of the combustion engine driven engine, thereby generating electric current.

Each power system 3 further comprises a power backup arrangement 10 comprising a converter unit 9 and a battery unit 11. The converter unit 9 is arranged to convert DC power provided by the battery unit to AC power for power provision to the vessel 1, and in particular to the thrusters thereof, for dynamic positioning purposes.

Each power system 3 comprises a bus 13 to which the first combustion engine driven generator G1 and the second combustion engine driven generator G2 and the power backup arrangement 10 are connectable via circuit breakers D for selectively controlling which units of the first combustion engine driven generator G1, the second combustion engine driven generator G2 and the power backup arrangement 10 are to be connected to the bus 13. The bus 13 may in one embodiment be an 11 kV bus.

Furthermore, the circuit breakers D may be used to disconnect any of the first combustion engine driven generator G1, the second combustion engine driven generator G2 and the power backup arrangement 10 in case any of these devices is subject to a failure and needs to trip.

In a first state of operation of a power system 3 the first combustion engine driven generator G1 is connected to the bus 13 to thereby be able to deliver power to the vessel 1 and to the thrusters thereof. The power backup arrangement 10 is also normally connected to the bus 13, whereby the converter unit 9 is able to deliver power to the vessel 1. In particular, a control unit (not shown) is arranged to control the converter unit 9, i.e. to control the switching of switching elements of the converter unit 9 such that a suitable power compensation can be provided to the vessel in case of failure of the first combustion engine driven generator.

In a second state of operation, which is a state in which the first combustion engine driven generator G1 is subject to a failure, the first combustion engine driven generator G1 is tripped, i.e. a breaker disconnects the first combustion engine driven generator G1 from the bus 13. Subsequently, the second combustion engine driven generator G2, which functions as a standby generator, is put into a running mode in order to be able to deliver power to the vessel 1. In the time between the first combustion engine driven generator G1 failing and the second combustion engine driven generator being able to generate power in a running mode, the power backup arrangement 10 provides power to the vessel 1 via the battery unit 11 and the converter unit 9. Thereby, the voltage level and the frequency level in the power system 3 can be maintained also during generator failure.

Figure 3:
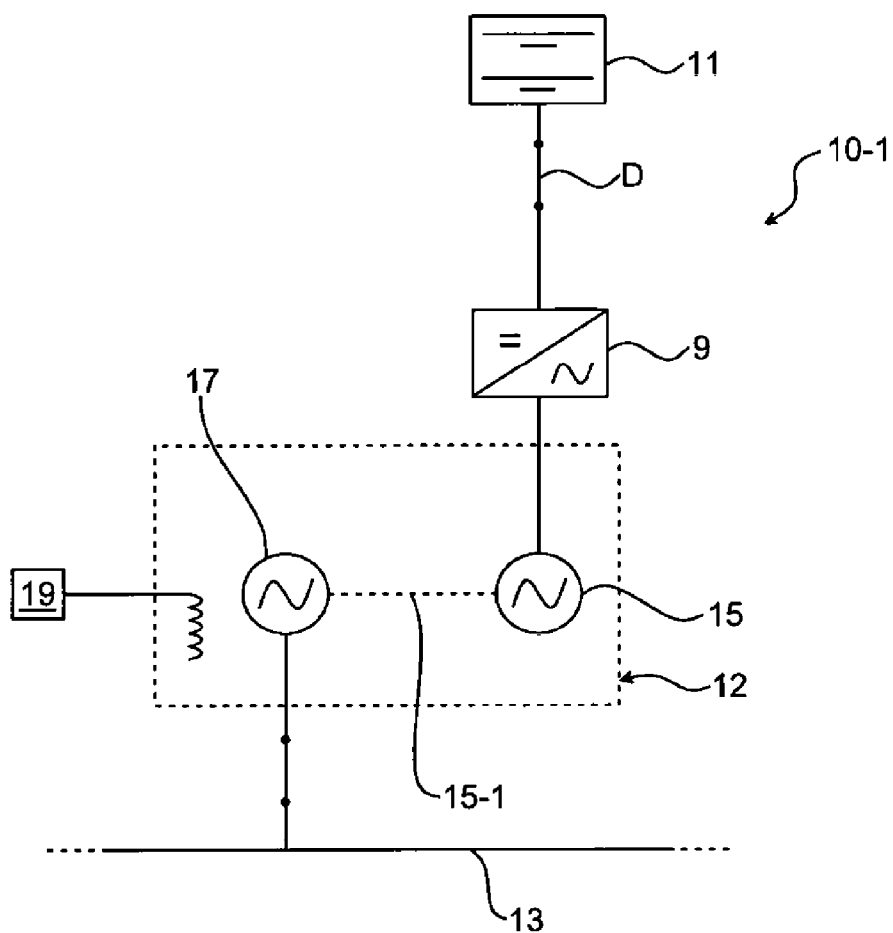
FIG. 3 is a schematic single line diagram of a backup system for each of the power systems in FIG. 2.

FIG. 3 shows an example of a power backup arrangement 10-1 forming part of a power system such as power system 3. The backup-arrangement 10-1 comprises a battery unit 11, a converter unit 9 connectable to the battery unit 11, and a rotary converter 12 connectable to the converter unit 9. In one embodiment the rotary converter 12 is a 690 V:11 kV rotary converter.

The rotary converter 12 comprises a motor 15 and a generator 17. The rotary converter 12 has a rotatable shaft 15-1, i.e. a rotor. Preferably, the rotatable shaft 15-1 is a common shaft to the generator 17 and the motor 15. Hence when the motor 15 via the converter unit 9 drives the rotatable shaft 15-1 to rotate, the rotatable shaft 15-1 induces currents in the stator of the generator 17. The generator 17 can thereby deliver power to the vessel 1 and its thrusters.

In one embodiment the generator 17 is a synchronous generator. The generator may in particular be an MV synchronous generator connectable to the bus 13 and to the motor 15. In one embodiment the motor is an induction motor. In one embodiment, the motor 15 is an LV induction motor. The MV synchronous generator may for instance be adapted to deliver 11 kV and the LV induction machine may have 690 V input terminals for driving the rotatable shaft 15-1.

The power backup arrangement 10-1 may further comprise a voltage regulator 19 such as an automatic voltage regulator connected to the rotary converter 12. Thereby the rotary converter 12 is able to maintain the alternating bus voltage at a constant amplitude level even when the first combustion engine driven generator fails or during load variations.

In normal operation of the power system 3, the battery unit 11 is charged via the bus 13, the rotary converter 12 and the converter unit 9. Alternatively, the battery unit 11 can be charged via other means. Furthermore, in normal operation the power backup arrangement 10-1 is connected to the bus 13 wherein the generator 17 shares the reactive load with the first combustion engine driven generator G1. Thus, the generator 17 helps to prevent trips due to voltage control problems.

The battery unit may comprise a variable-frequency drive with Direct Torque Control (DTC) in order to control the torque and hence the rotational speed of the motor 15.

In the event of a situation occurring resulting in the power system being in its second operational state e.g. if the first combustion engine driven generator G1 trips, the rotary converter 12 bumplessly maintains the power system voltage and frequency until the converter unit 9 begins delivering power, wherein the rotary converter provides both active and reactive power to the vessel 1.

In one embodiment in which the converter unit 9 comprises a variable-frequency drive, frequency control is achieved by setting the speed reference to the lowest rpm value which might normally occur in droop mode, typically 96% which is 57.6 Hz in a 60 Hz power system. The converter unit 9 would then start delivering power as soon as the frequency fell below that value, either as a result of a generator trip or a heavy load transient. It is to be noted that the power systems presented herein may also be utilised with other frequencies than 60 Hz.

For power system configurations where several buses may be run in parallel, for example a semi-submersible rig in two-split bus mode, it is envisaged that in some embodiments frequency droop could be applied to the speed reference to allow the converter units of each bus or bus split to be run in parallel. Frequency droop means that the speed setpoint for the rotary converter 12 is reduced with increasing load, typically active power load, on the rotary converter. Frequency droop can be used to achieve load sharing between parallel-running generators without the need for common speed control of the generators. Power systems where the relationship between the load and the speed setpoint of the generators is predetermined and does not vary in normal operation are called fixed-droop power systems.

In fixed-droop power systems, additional capabilities could be achieved by careful choice of the converters units' droop curves. For example, in one embodiment the converter units could be designed to deliver their power when the load on the generators is between 60% and 80%, thus achieving a form of peak load shaving and helping to maintain sufficient power reserves on the combustion engine driven generators.

In one embodiment, the motoring and braking torque limits on the variable-frequency drive could be controlled by a battery management application which could run in an overriding PLC. The PLC application could also include functions for starting the rotary converter on battery power and synchronising it to the power system. Without the constraints imposed by a combustion engine, the rated speed of the rotary converter could be chosen more freely in order to optimise its cost, weight and moment of inertia (frequency dynamics). Its low duty cycle would also mean that it could be under-dimensioned, resulting in further reductions in size and weight.

In an alternative embodiment, the power system has a power backup arrangement comprising the battery unit, the converter unit connectable to the battery unit, and a transformer (not shown) which is connectable to the bus. In this embodiment the converter unit is connectable to one side of the transformer windings and the bus is connectable to the other side of the transformer windings. The transformer may for instance be a 690 V:11 kV transformer. Thereby a low-voltage converter unit can be connected to a medium voltage bus.

In this embodiment, the converter unit is provided with a controller which ensures that it maintains the bus voltage and frequency in the event of the sudden failure of the first combustion engine driven generator. The controller is also arranged to ensure correct control of the active and reactive power delivered by the converter unit in the first operational state, the second operational state and during the transition between the first and the second operational states.

In any embodiment, the capacity of the battery unit 9 could for instance be chosen in the range 25-75 kWh. The relatively low capacity battery unit which may be utilised is due to the short time required to start a standby combustion engine driven generator, which is typically less than 1 minute. Thus, the low required energy capacity combined with the low duty cycle and high voltage may allow the peak power to be met with a reasonably sized battery.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

What is claimed is:

1. A power system comprising:
a first combustion engine driven generator,
a second combustion engine driven generator,
a battery unit, and
a converter unit arranged to provide power to a vessel from the battery unit,
wherein in a first operational state of the power system only the first combustion engine driven generator is arranged to deliver power for dynamic positioning of the vessel, and wherein in a second operational state in which the first combustion engine driven generator is subject to a failure, the first combustion engine driven generator is disconnected from the power system so that it is unable to deliver power for dynamic positioning of the vessel and the second combustion engine driven generator is arranged to deliver power for dynamic positioning of the vessel, and wherein the converter unit is arranged to deliver power to the vessel during a transition from the first operational state to the second operational state, and
wherein the power system is for dynamic positioning of the vessel so that the vessel maintains position and heading despite forces acting on the vessel.

2. The power system as claimed in claim 1, wherein the first operational state is a state in which the first combustion engine driven generator is in a normal operational mode.

3. The power system as claimed in claim 1 further comprising a bus, wherein the first combustion engine driven generator and the second combustion engine driven generator are connectable to the bus, and wherein the converter unit is connectable to the bus and to the battery unit.

4. The power system as claimed in claim 3 further comprising a rotary converter, wherein the converter unit is connectable to the bus via the rotary converter.

5. The power system as claimed in claim 4, wherein the rotary converter comprises a generator and an induction machine electrically coupled via a rotatable shaft of the rotary converter.

6. The power system as claimed in claim 5, wherein the generator is an MV synchronous generator.

7. The power system as claimed in claim 5, wherein the induction machine is an LV induction machine.

8. The power system as claimed in claim 5, wherein the induction machine is connectable to the converter unit, and wherein the generator is connectable to the bus.

9. The power system as claimed in claim 1, wherein the converter unit is adapted to deliver power to the vessel when a power system frequency is below a predetermined threshold.

10. The power system as claimed in claim 5, wherein the converter unit comprises a variable-frequency drive for controlling a rotational speed of the induction machine.

11. A sectionalised power system comprising:
at least two power systems, each power system having:
a first combustion engine driven generator,
a second combustion engine driven generator,
a battery unit, and
a converter unit arranged to provide power to a vessel from the battery unit,
wherein in a first operational state of the power system only the first combustion engine driven generator is arranged to deliver power for dynamic positioning of the vessel, and wherein in a second operational state in which the first combustion engine driven generator is subject to a failure, the first combustion engine driven generator is disconnected from the power system so that it is unable to deliver power for dynamic positioning of the vessel and the second combustion engine driven generator is arranged to deliver power for dynamic positioning of the vessel, and wherein the converter unit is arranged to deliver power to the vessel during a transition from the first operational state to the second operational state, said sectionalized power system further having at least one bustie, wherein the at least two power systems are connectable by means of the at least one bustie.

12. A vessel comprising a sectionalised power system according to claim 11.

13. A method for dynamic positioning of a vessel using a power system having a first combustion engine driven generator, a second combustion engine driven generator, a battery unit, and a converter unit arranged to provide power to a vessel from the battery unit, the method comprising:

delivering power for dynamic positioning of the vessel in a first operational state of the power system only with the first combustion engine driven generator, delivering power for dynamic positioning of the vessel in a second operational state, in which the first combustion engine driven generator is subject to a failure, with the second combustion engine driven generator, and disconnecting the first combustion engine driven generator from the power system so that it is unable to deliver power for dynamic positioning of the vessel, and delivering power, by means of the converter unit, to the vessel during a transition from the first operational state to the second operational state.

14. The method as claimed in claim 13, wherein a control unit is arranged to control a switching of switching elements of the converter unit such that a suitable power compensation can be provided to the vessel.

15. The method as claimed in claim 13, wherein the power system comprises a rotary converter, wherein the converter unit is connectable to a bus via the rotary converter, and wherein the rotary converter has a generator and an induction machine electrically coupled via a rotatable shaft of the rotary converter.

16. The method as claimed in claim 15, wherein the converter unit comprises a variable-frequency drive, the converter unit delivering power to the induction machine when a speed reference is below a lowest revolutions per minute, rpm, value which might normally occur in droop mode.

17. The power system as claimed in claim 1, further comprising a sensor system sensing forces acting on the vessel and a control system controlling thrusters in response to the sensed forces.

18. A vessel comprising:
a plurality of thrusters;
a power system according to claim 1 that powers the thrusters;
a sensor system sensing forces acting on the vessel; and
a control system controlling the thrusters in response to the sensed forces such that the vessel maintains position and heading despite forces acting on the vessel.

19. The method as claimed in claim 13, further comprising:
sensing forces acting on the vessel; and
controlling thrusters in response to the sensed forces such that the vessel maintains position and heading despite the forces acting on the vessel.

* * * * *